United States Patent
Wang et al.

(10) Patent No.: US 12,203,754 B1
(45) Date of Patent: Jan. 21, 2025

(54) PHOTOGRAMMETRIC GROUND CONTROL POINT QUALITY EVALUATION METHOD BASED ON MONTE CARLO TEST

(71) Applicant: Nanjing University of Information Science & Technology, Nanjing (CN)

(72) Inventors: Guojie Wang, Nanjing (CN); Wen Dai, Nanjing (CN); Bo Wang, Nanjing (CN); Aili Liu, Nanjing (CN); Ruibo Qiu, Nanjing (CN); Kai Chen, Nanjing (CN)

(73) Assignee: NANJING UNIVERSITY OF INFORMATION SCIENCE & TECHNOLOGY, Nanjing (CN)

( * ) Notice: Subject to any disclaimer, the term of this patent is extended or adjusted under 35 U.S.C. 154(b) by 0 days.

(21) Appl. No.: 18/761,326

(22) Filed: Jul. 2, 2024

(30) Foreign Application Priority Data

Dec. 22, 2023 (CN) .......................... 202311777570.7

(51) Int. Cl.
  *G01C 11/06* (2006.01)
  *G01C 11/34* (2006.01)

(52) U.S. Cl.
  CPC .............. *G01C 11/06* (2013.01); *G01C 11/34* (2013.01)

(58) Field of Classification Search
  None
  See application file for complete search history.

(56) References Cited

U.S. PATENT DOCUMENTS

| | | | |
|---|---|---|---|
| 2019/0130641 A1* | 5/2019 | Barajas Hernandez | ..................... G06V 20/13 |
| 2019/0268519 A1* | 8/2019 | Cope | .................... H04N 25/531 |

* cited by examiner

*Primary Examiner* — Leon Viet Q Nguyen

(57) ABSTRACT

A photogrammetric ground control point quality evaluation method based on Monte Carlo test relates to the field of photogrammetry technology. Firstly, aerial photographs and ground control points from a survey area are obtained, the ground control points are numbered, the aerial photographs are performed with point-placing and aerial triangulation densification. Secondly, a Monte Carlo test experiment is designed, a certain number of the ground control points are selected as control points with the rest as check points, ensuring each ground control point as the control point a certain number of times, and average errors of the ground control points are calculated. Thirdly, average values of the average errors of the ground control points are calculated, standard deviations of the average errors of the ground control points are calculated. Finally, a quality coefficient Q of each ground control point is calculated and evaluated according to quality evaluation standards.

8 Claims, 4 Drawing Sheets

PHOTOGRAMMETRIC GROUND CONTROL POINT QUALITY EVALUATION METHOD BASED ON MONTE CARLO TEST

CROSS-REFERENCE TO RELATED APPLICATION

This application claims priority to Chinese Patent Application No. 202311777570.7, filed Dec. 22, 2023, which is herein incorporated by reference in its entirety.

TECHNICAL FIELD

The disclosure relates to the field of photogrammetry technology, and more particularly to a photogrammetric ground control point quality evaluation method based on Monte Carlo test.

BACKGROUND

Photogrammetry can conveniently and quickly obtain surface information without the need for actual contact with a measured object. The photogrammetry utilizes advanced position detection technology, geographic technology and information technology etc., to construct surface products such as orthophotos and digital elevation models. The photogrammetry is widely applied in fields such as earth science and engineering construction etc.

Ground control points (i.e., GCP) are a foundation of photogrammetric modelling. The ground control points can correct positional offsets and insufficient coordinate accuracy caused by aircraft positioning limitations or electromagnetic interference. Quality of the ground control points directly affects precision of photogrammetric survey results.

In practical processing, there may be significant errors in control points in a photogrammetric model, such as GCP survey error and GCP placing error. Therefore, before processing photogrammetric data, quality analysis of the ground control points should be conducted first, and data processing should be carried out after eliminating the errors in the ground control points to ensure accuracy of the photogrammetry and modeling.

However, at present, there is relatively little research on quality evaluation of the ground control points. To ensure accuracy of data processing, a reasonable and universal method is needed to evaluate the quality of the ground control points in the photogrammetry.

SUMMARY

To overcome above technical problems, the disclosure provides a photogrammetric ground control point quality evaluation method based on Monte Carlo test, including following steps.

S1, aerial photographs and ground control point data from a survey area are obtained, with a number of ground control points of the ground control point data denoted as n, and the aerial photographs are performed with placing (i.e., transfer the ground control point data onto the aerial photographs) and aerial triangulation densification.

S2, 40% to 60% of the number of the ground control points are randomly selected as control points to participate in bundle adjustment optimization, with a number of the control points denoted as m, and remaining (n-m) ground control points are used as check points.

S3, the number of the control points is kept at m, a $1^{st}$ ground control point of the ground control points is selected as a fixed control point, and remaining (m−1) control points are randomly selected from the ground control points more than 2n times, the bundle adjustment optimization is performed to the control points after each time of selection, and errors of the check points and the control points are calculated and recorded after each bundle adjustment optimization.

S4, a $2^{nd}$ ground control point to a n-th ground control point of the ground control points are sequentially selected as the fixed control point, the step S3 is repeated until iteration for the n-th ground control point is completed.

S5, a quality coefficient Q of each ground control point is calculated and evaluated to obtain a quality evaluation result of each ground control point.

In an embodiment, the photogrammetric ground control point quality evaluation method based on the Monte Carlo test further includes following steps: low-quality ground control points (e.g., the quality coefficient Q is equal to or greater than 2) are removed according to the quality evaluation result of each ground control point, and the rest ground control points are used to generate a topographic map, thereby applying the topographic map into earth science and engineering construction; for example, the topographic map is used to evaluate a disaster situation, so that rescuers can distribute materials and deploy personnel according to the disaster evaluation situation to carry out disaster rescue operations; in addition, post-disaster reconstruction personnel can also plan new roads, houses and other infrastructure according to the disaster evaluation situation.

The further limited technical solution of the present invention is as follows.

In an embodiment, the step S1 specifically includes following sub-steps.

S1.1, the aerial photographs and the ground control point data from the survey area are obtained, the ground control points are numbered as 1, 2, . . . , n, respectively.

S1.2, automatic feature point matching is performed on the aerial photographs.

S1.3, the ground control points are transferred (placed) onto the aerial photographs.

S1.4, the aerial triangulation densification is performed to obtain a sparse point cloud of the survey area.

In the sub-step S1.2, the automatic feature point matching is performed by a scale-invariant feature transform (SIFT) image matching algorithm.

In an embodiment, in the sub-step S1.4, the aerial triangulation densification is performed by a structure from motion (SfM) algorithm.

In an embodiment, in the step S2, 50% of the number of the ground control points are selected as the control points to participate in the bundle adjustment optimization.

In an embodiment, in the step S3, a formula for calculating the errors of the check points and the control points after each bundle adjustment optimization is as follows:

$$\Delta = \sqrt{(\Delta x_i)^2 + (\Delta y_i)^2 + (\Delta z_i)^2}$$

Where $\Delta x_i$ represents a difference between an observed value of each ground control point after the aerial triangulation densification and a coordinate value of each ground control point in an x direction, $\Delta y_i$ represents a difference between an observed value of each ground control point after the aerial triangulation densification and a coordinate value of each ground control point in a y direction, and $\Delta z_i$ represents a difference between an observed value of each ground control point after the aerial triangulation densification and a coordinate value of each ground control point in a z direction.

In an embodiment, the step S5 specifically includes following sub-steps.

S5.1, average errors of the ground control points serving as the control points and the average errors of the ground control points serving as the check points are calculated to obtain an average error graph of the ground control points as the control points and the check points.

S5.2, average values p of the average errors of the ground control points as the control points and the check points are calculated, standard deviations σ of the ground control points as the control points and the check points are calculated respectively, and the quality coefficient Q of each ground control point is calculated.

S5.3, the quality coefficient Q of each ground control point is evaluated to obtain the quality evaluation result of each ground control point.

In an embodiment, in the sub-step S5.1, a formula for calculating the average errors of each ground control point as the control point and the check point respectively is as follows:

$$M_{mean} = \frac{\sum_{i=1}^{w} x_i}{w}$$

Where w represents a number of times that each ground control point as either the control point or the check point, and $x_i$ represents the error of each ground control point as either the control point or the check point in the step S3.

In an embodiment, in the sub-step S5.2, formulas for calculating the quality coefficient Q of each ground control point are as follows:

$$Q_{ch} = \frac{x_{ich} - \mu_{ch}}{\sigma_{ch}}, Q_{co} = \frac{x_{ico} - \mu_{co}}{\sigma_{co}}, Q = \frac{Q_{ch} - Q_{co}}{2}.$$

Where $Q_{ch}$ represents a quality coefficient of the ground control point as the check point, $Q_{co}$ represents a quality coefficient of the ground control point as the control point, $x_{ich}$ represents the average error of the ground control point as the check point, $x_{ico}$ represents the average error of the ground control point as the control point, $\mu_{ch}$ represents an average value of the average errors of the ground control points as the check points, $\mu_{co}$ represents an average value of the average errors of the ground control points as the control points, $\sigma_{co}$ represents the standard deviation of the ground control point as the control point, and $\sigma_{ch}$ represents the standard deviation of the ground control point as the check point.

In an embodiment, in the sub-step 55.3, when the quality coefficient Q is less than 1, quality of the respective ground control point is evaluated as excellent, when the quality coefficient Q is less than 2 but not less than 1, the quality of the respective ground control point is evaluated as good, when the quality coefficient Q is less than 3 but not less than 2, the quality of the respective ground control point is evaluated as average, and when the quality coefficient Q is equal to or greater than 3, the quality of the respective ground control point is evaluated as poor.

The disclosure has below beneficial effects.

In the disclosure, firstly, the aerial photographs and the ground control point data from the survey area are obtained, the ground control points are numbered, and the aerial photographs are performed with the point-placing and the aerial triangulation densification. Secondly, a Monte Carlo test experiment is designed, a certain number of the ground control points are selected as the control points with the rest of the ground control points as the check points, ensuring each ground control point as the control point a certain number of times, and the average errors of the ground control points as the control points and the check points are calculated. Thirdly, the average values of the average errors of the ground control points as the control points and the check points are calculated, the standard deviations of the average errors of the ground control points as the control points and the check points are calculated. Finally, the quality coefficient Q of each ground control point is calculated and evaluated according to quality evaluation standards. Problem of insufficient quality evaluation technology for the ground control points is solved, ensuring the quality of the ground control points, and avoiding photogrammetric errors caused by survey errors or point-placing errors of the ground control points.

DETAILED DESCRIPTION OF EMBODIMENTS

Figure 1:
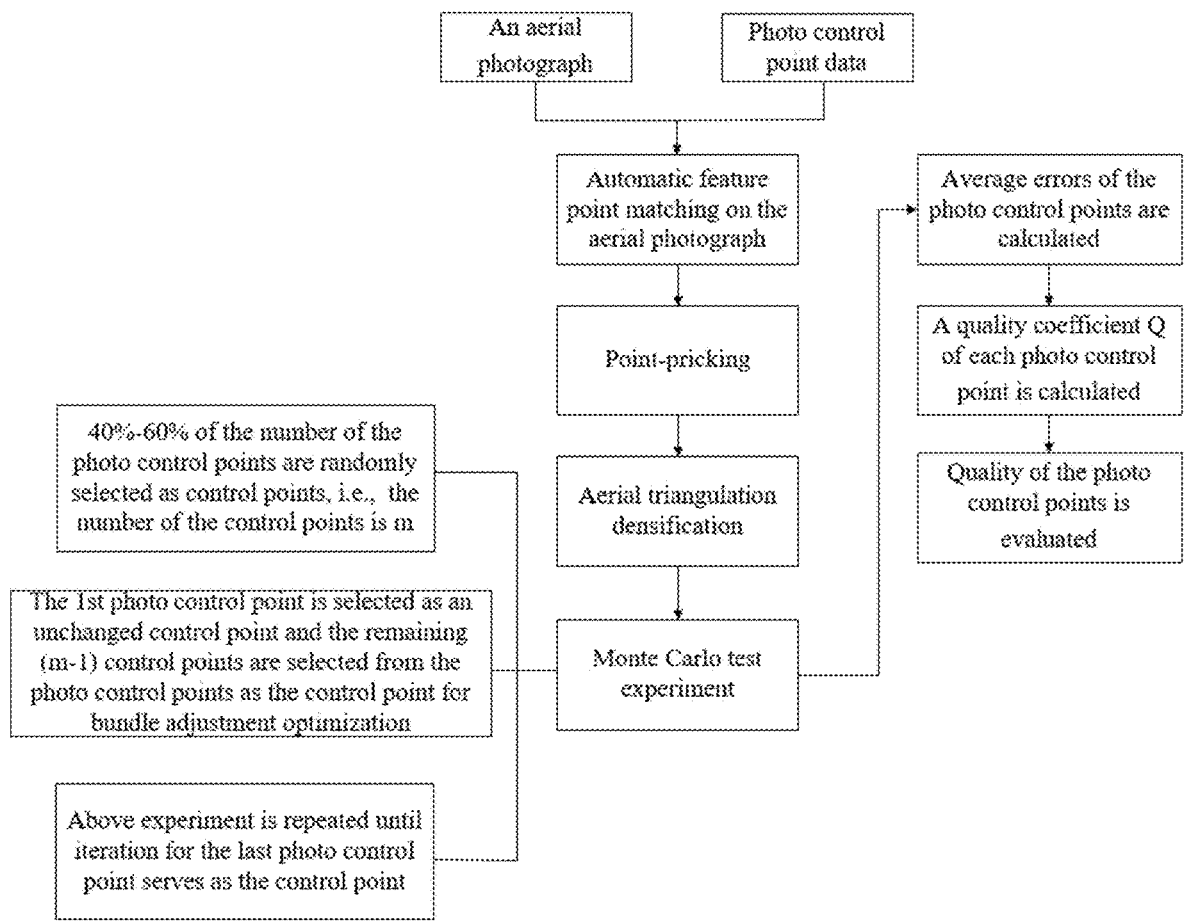
FIG. 1 illustrates a schematic flowchart of the disclosure.

The embodiment provides a photogrammetric ground control point quality evaluation method based on Monte Carlo test, as shown in FIG. 1, including following steps.

S1, an aerial photograph and ground control point data from a survey area are obtained, with a number of ground control points of the ground control point data denoted as n, and the aerial photograph is performed with point-placing and aerial triangulation densification. The step S1 specifically includes following sub-steps.

Figure 2:
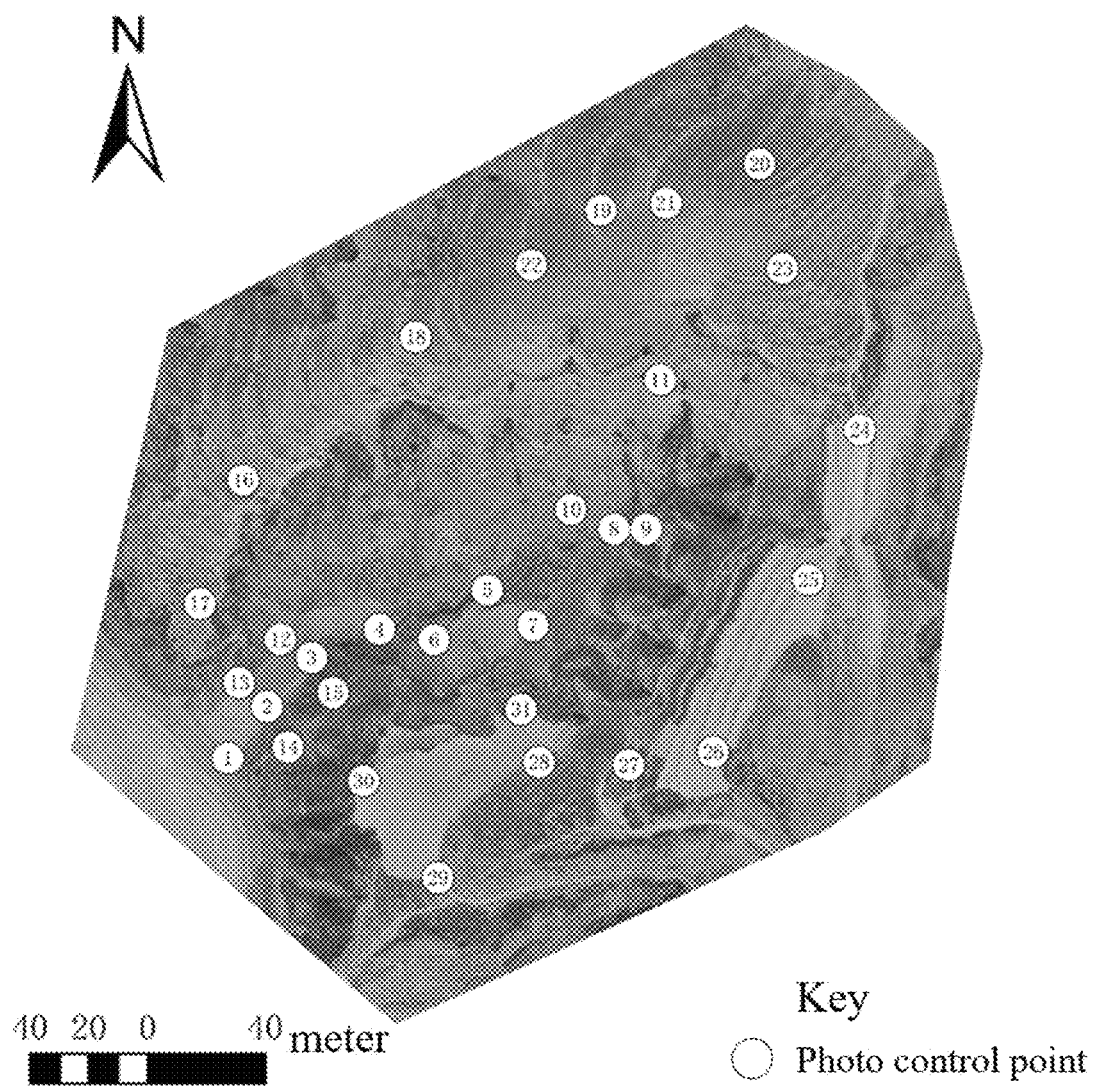
FIG. 2 illustrates a schematic distribution diagram of ground control points in a measurement implementation area according to an embodiment of the disclosure.

S1.1, as shown in FIG. 2, which illustrates a schematic distribution diagram of ground control points in a measurement implementation area (i.e., survey area), the aerial photograph and the ground control point data of the measurement implementation area are obtained, the ground control points are numbered 1, 2, . . . , 31. The ground control point data is shown in Table 1 below.

TABLE 1 the ground control point data

| Ground control point | Longitude | Latitude | Altitude (meter) |
|---|---|---|---|
| 1 | 110.2832 | 37.56377 | 900.4413 |
| 2 | 110.283 | 37.56339 | 879.0414 |
| 3 | 110.2838 | 37.56421 | 921.3628 |
| 4 | 110.2845 | 37.56461 | 943.2494 |
| 5 | 110.2851 | 37.56476 | 957.294 |
| 6 | 110.2848 | 37.56463 | 950.3832 |
| 7 | 110.2843 | 37.56444 | 934.8491 |
| 8 | 110.2852 | 37.56443 | 946.0901 |
| 9 | 110.2855 | 37.56394 | 923.5667 |
| 10 | 110.2853 | 37.56348 | 920.9627 |
| 11 | 110.2847 | 37.5629 | 910.7715 |

TABLE 1-continued the ground control point data

| Ground control point | Longitude | Latitude | Altitude (meter) |
|---|---|---|---|
| 12 | 110.2843 | 37.56291 | 901.0292 |
| 13 | 110.2836 | 37.56284 | 890.3642 |
| 14 | 110.2842 | 37.56307 | 893.1107 |
| 15 | 110.2831 | 37.56291 | 848.7975 |
| 16 | 110.2833 | 37.56307 | 849.0417 |
| 17 | 110.2834 | 37.56322 | 849.1912 |
| 18 | 110.2837 | 37.56331 | 853.9771 |
| 19 | 110.2841 | 37.56344 | 861.9669 |
| 20 | 110.2839 | 37.56328 | 863.399 |
| 21 | 110.2843 | 37.56333 | 877.3997 |
| 22 | 110.2846 | 37.56363 | 879.2573 |
| 23 | 110.2847 | 37.56363 | 887.1184 |
| 24 | 110.2844 | 37.56369 | 882.3266 |
| 25 | 110.2842 | 37.56384 | 898.4583 |
| 26 | 110.2848 | 37.56409 | 918.0289 |
| 27 | 110.2833 | 37.56328 | 849.4488 |
| 28 | 110.2832 | 37.56319 | 849.0631 |
| 29 | 110.2832 | 37.56314 | 848.9395 |
| 30 | 110.2833 | 37.56295 | 860.6629 |
| 31 | 110.2835 | 37.56311 | 862.2262 |

S1.2, a SIFT image matching algorithm is used to perform automatic feature point matching on the aerial photograph.

S1.3, the ground control points are transferred onto the aerial photograph.

S1.4, the aerial triangulation densification (i.e., photogrammetric triangulation) is performed by a SfM algorithm to obtain a sparse point cloud of the survey area.

S2, 50% of the number of the ground control points are randomly selected as control points to participate in bundle adjustment optimization, in the embodiment, the number of the control points is 15, and remaining 16 ground control points are check points. Bundle adjustment is a process of treating coordinates of the control points as observed values and substituting them into the aerial triangulation network. Through a bundle adjustment algorithm, internal and external orientation elements of a camera are optimized collectively.

S3, the number of the control points is kept at 15, a $1^{st}$ ground control point of the ground control points is selected as a fixed control point, the remaining 14 control points are selected from the ground control points more than 62 times, the bundle adjustment optimization is performed to the control points after each time of selection, and errors of the check points and the control points are calculated and recorded after each bundle adjustment optimization.

The errors of the check points and the control points after each bundle adjustment optimization are differences between the observed values and coordinates of the ground control points after the aerial triangulation densification. A formula for calculating the errors is as follows:

$$\Delta = \sqrt{(\Delta x_i)^2 + (\Delta y_i)^2 + (\Delta z_i)^2}$$

Where $\Delta x_i$ represents a difference between an observed value of each ground control point after the aerial triangulation densification and a coordinate value of each ground control point in an x direction, $\Delta y_i$ represents a difference between an observed value of each ground control point after the aerial triangulation densification and a coordinate value of each ground control point in a y direction, and $\Delta z_i$ represents a difference between an observed value of each ground control point after the aerial triangulation densification and a coordinate value of each ground control point in a z direction.

S4, a $2^{nd}$ ground control point to a n-th ground control point of the ground control points are sequentially selected as the fixed control point, the step S3 is repeated until iteration for the n-th ground control point is completed.

S5, a quality coefficient Q of each ground control point is calculated and evaluated to obtain a quality evaluation result of each ground control point. The step S5 specifically includes following sub-steps.

Figure 3:
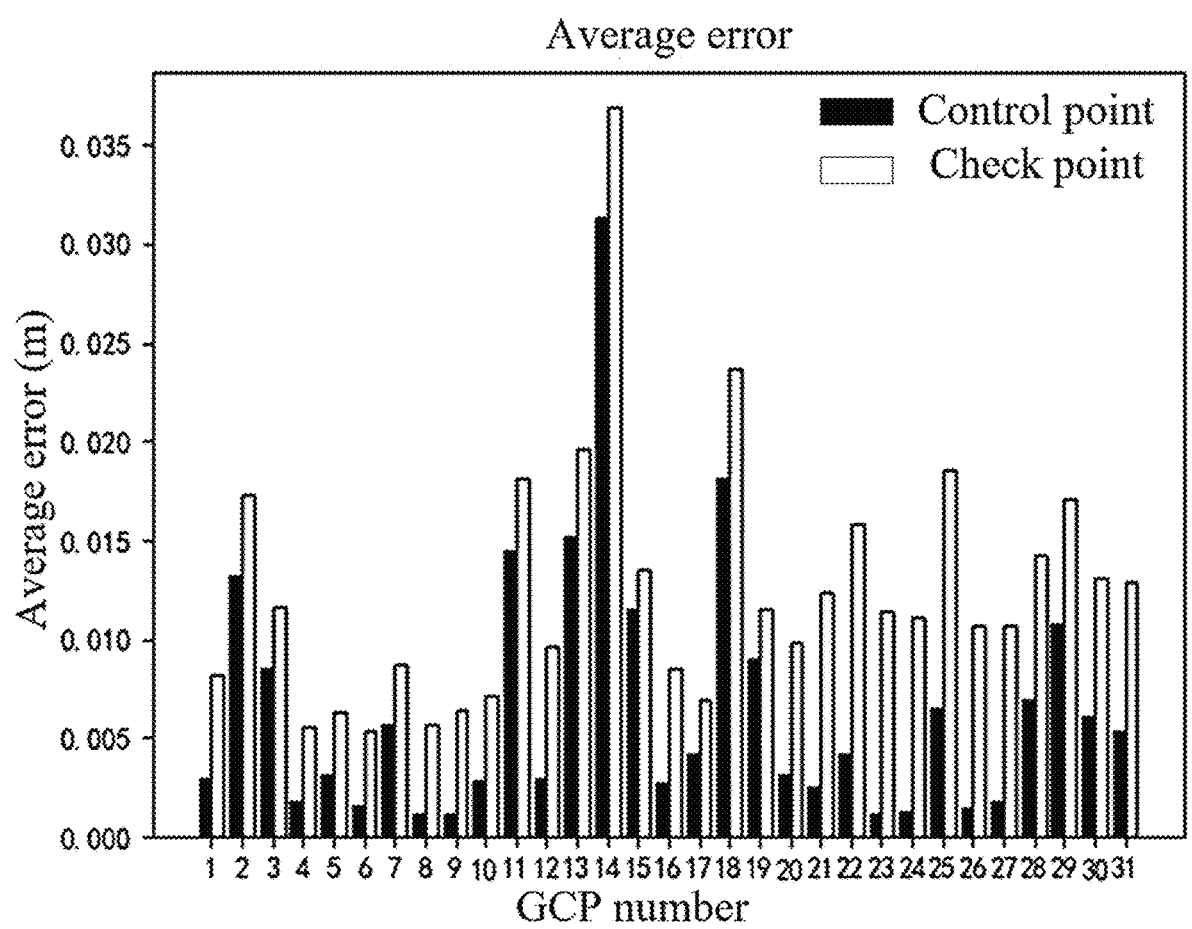
FIG. 3 illustrates an average error graph for the ground control points serving as control points and check points according to the embodiment of the disclosure.

S5.1, average errors of the ground control points serving as the control points and average errors of the ground control points serving as the check points are calculated to obtain an average error graph of the ground control points as the control point and the check points. FIG. 3 illustrates the average error graph for the ground control points serving as the control points and the check points. A formula for calculating the average errors of each ground control point serving as the control point and the check point respectively is as follows:

$$M_{mean} = \frac{\sum_{i=1}^{w} x_i}{w}$$

Where w represents a number of times that each ground control point serves as either the control point or the check point, i.e., 31 times, and $x_i$ represents the error of each ground control point as either the control point or the check point in the step S3.

S5.2, average values p of the average errors of the ground control points as the control points and as the check points are calculated, standard deviations a of the ground control points as the control points and the check points are calculated, and the quality coefficient Q of each ground control point is calculated. Formulas for calculating the quality coefficient Q of each ground control point are as follows:

$$Q_{ch} = \frac{x_{ich} - \mu_{ch}}{\sigma_{ch}}, Q_{co} = \frac{x_{ico} - \mu_{co}}{\sigma_{co}}, Q = \frac{Q_{ch} - Q_{co}}{2}.$$

Where $Q_{ch}$ represents a quality coefficient of the ground control point as the check point, $Q_{co}$ represents a quality coefficient of the ground control point as the control point, $x_{ich}$ represents the average error of the ground control point as the check point, $x_{ico}$ represents the average error of the ground control point as the control point, $\mu_{ch}$ represents an average value of the average errors of the ground control points as the check points, $\mu_{co}$ represents an average value of the average errors of the ground control points as the control points, $\sigma_{co}$ represents the standard deviation of the ground control point as the control point and $\sigma_{ch}$ represents the standard deviation of the ground control point as the check point.

Figure 4:
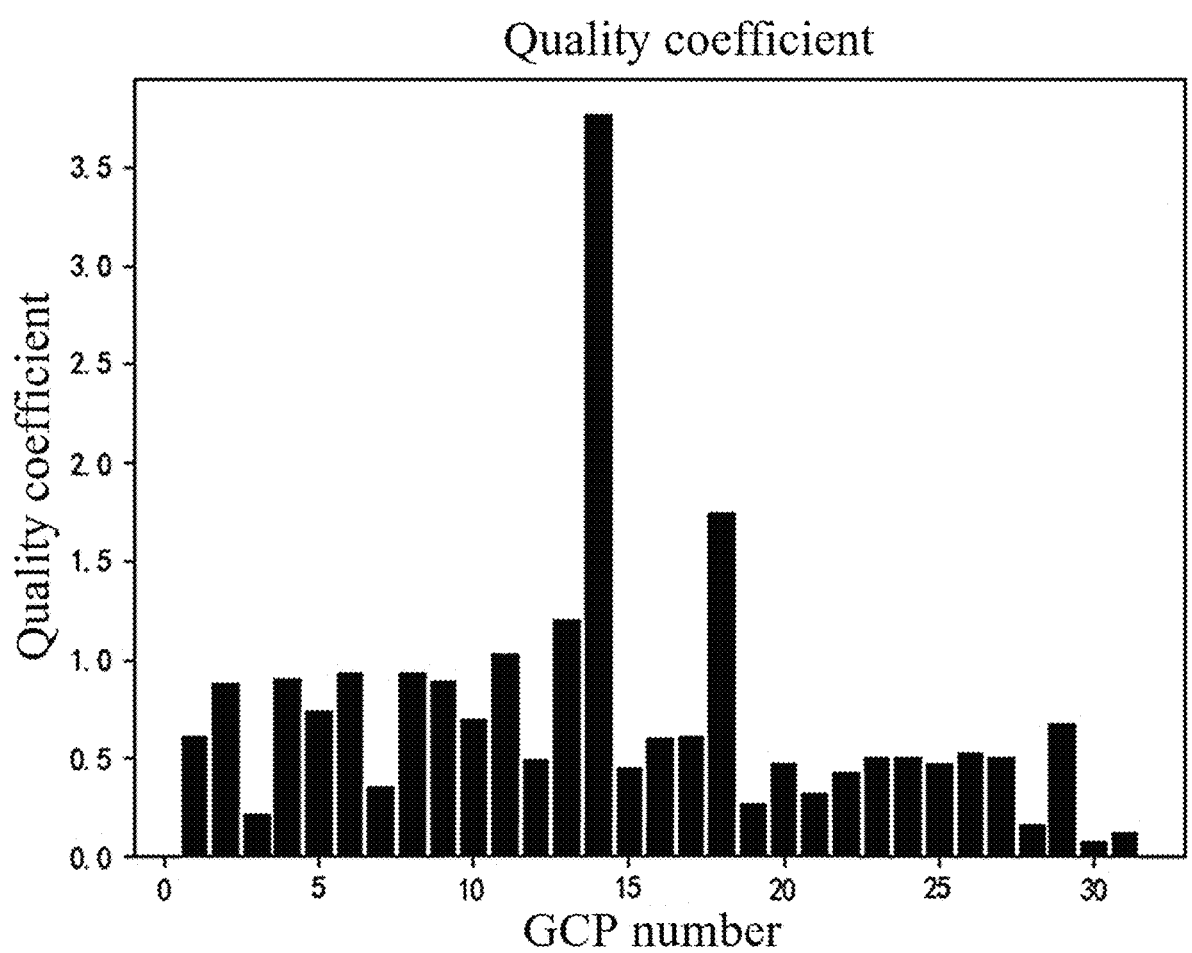
FIG. 4 illustrates a schematic diagram of quality coefficients of the ground control points according to the embodiment of the disclosure.

S5.3, as shown in FIG. 4, FIG. 4 illustrates a schematic diagram of the quality coefficient of each ground control points, the quality coefficient Q of each ground control point is evaluated. When the quality coefficient Q is less than 1, quality of the respective ground control point is evaluated as excellent, when the quality coefficient Q is less than 2 but not less than 1, the quality of the respective ground control point is evaluated as good, when the quality coefficient Q is less than 3 but not less than 2, the quality of the respective ground control point is evaluated as average, and when the quality coefficient Q is not less than 3, the quality of the respective ground control point is evaluated as poor.

The quality evaluation result of the ground control points is shown in Table 2 below.

TABLE 2 the quality evaluation result of the ground control points

| Ground control point | Quality coefficient | Evaluation |
| --- | --- | --- |
| 1 | 0.613 | Excellent |
| 2 | 0.876 | Excellent |
| 3 | 0.214 | Excellent |
| 4 | 0.895 | Excellent |
| 5 | 0.742 | Excellent |
| 6 | 0.937 | Excellent |
| 7 | 0.359 | Excellent |
| 8 | 0.937 | Excellent |
| 9 | 0.889 | Excellent |
| 10 | 0.701 | Excellent |
| 11 | 1.034 | Good |
| 12 | 0.495 | Excellent |
| 13 | 1.200 | Good |
| 14 | 3.764 | Poor |
| 15 | 0.454 | Excellent |
| 16 | 0.596 | Excellent |
| 17 | 0.609 | Excellent |
| 18 | 1.742 | Good |
| 19 | 0.267 | Excellent |
| 20 | 0.468 | Excellent |
| 21 | 0.324 | Excellent |
| 22 | 0.434 | Excellent |
| 23 | 0.500 | Excellent |
| 24 | 0.504 | Excellent |
| 25 | 0.469 | Excellent |
| 26 | 0.525 | Excellent |
| 27 | 0.502 | Excellent |
| 28 | 0.164 | Excellent |
| 29 | 0.678 | Excellent |
| 30 | 0.077 | Excellent |
| 31 | 0.117 | Excellent |

Firstly, the aerial photograph and the ground control point data from the survey area are obtained, the ground control points are numbered, and the aerial photograph is performed with the point-placing and the aerial triangulation densification. Secondly, a Monte Carlo test experiment is designed, a certain number of the ground control points are selected as the control points with the rest of the ground control points as the check points, ensuring each ground control point as the control point a certain number of times, and the average errors of the ground control points as the control points and the check points are calculated. Thirdly, the average values of the average errors of the ground control points as the control points and the check points are calculated, the standard deviations of the average errors of the ground control points as the control points and the check points are calculated. Finally, the quality coefficient Q of each ground control point is calculated and evaluated according to quality evaluation standards. Therefore, the problem of insufficient quality evaluation technology for the ground control points is solved, ensuring the quality of the ground control points, and avoiding photogrammetric errors caused by survey errors or point-placing errors of the ground control points.

In addition to the above embodiment, the disclosure may also have other embodiments. Any technical solution formed by equivalent substitution or equivalent transformation falls within the protection scope of the disclosure.

What is claimed is:

1. A photogrammetric ground control point quality evaluation method based on Monte Carlo test, comprising following steps:
S1, obtaining aerial photographs and ground control point data from a survey area, with a number of ground control points of the ground control point data denoted as n, and performing point-placing and aerial triangulation densification on the aerial photographs;
S2, randomly selecting 40% to 60% of the number of the ground control points as control points to participate in bundle adjustment optimization, with a number of the control points denoted as m, and using remaining (n−m) ground control points as check points;
S3, keeping the number of the control points unchanged at m, selecting a $1^{st}$ ground control point of the ground control points as a fixed control point, and randomly selecting remaining (m−1) control points from the ground control points more than 2n times, performing the bundle adjustment optimization to the control points after each time of selection, calculating and recording errors of the check points and the control points after each bundle adjustment optimization;
wherein a formula for calculating the errors of the check points and the control points after each bundle adjustment optimization is as follows:

$$\Delta = \sqrt{(\Delta x_i)^2 + (\Delta y_i)^2 + (\Delta z_i)^2},$$

where $\Delta x_i$ represents a difference between an observed value of each ground control point after the aerial triangulation densification and a coordinate value of each ground control point in an x direction, $\Delta y_i$ represents a difference between an observed value of each ground control point after the aerial triangulation densification and a coordinate value of each ground control point in a y direction, and $\Delta z_i$ represents a difference between an observed value of each ground control point after the aerial triangulation densification and a coordinate value of each ground control point in a z direction;
S4, sequentially selecting a $2^{nd}$ ground control point to a n-th ground control point of the ground control points as the fixed control point, repeating the step S3 until iteration for the n-th ground control point is completed; and
S5, calculating and evaluating a quality coefficient Q of each ground control point to obtain a quality evaluation result of each ground control point; wherein the step S5 specifically comprises following sub-steps:
S5.1, calculating average errors of the ground control points serving as the control points and the average errors of the ground control points serving as the check points to obtain an average error graph of the ground control points as the control points and the check points;
S5.2, calculating average values u of the average errors of the ground control points as the control points and the check points, calculating standard deviations σ of the ground control points as the control points and the check points, and calculating the quality coefficient Q of each ground control point; and
S5.3, evaluating the quality coefficient Q of each ground control point to obtain the quality evaluation result of each ground control point.

2. The photogrammetric ground control point quality evaluation method based on Monte Carlo test as claimed in claim 1, wherein the step S1 specifically comprises following sub-steps:
S1.1, obtaining the aerial photographs and the ground control point data from the survey area, numbering the ground control points as 1, 2, . . . , n, respectively;
S1.2, performing automatic feature point matching on the aerial photographs;

S1.3, transferring the ground control points onto the aerial photographs; and

S1.4, performing the aerial triangulation densification to obtain a sparse point cloud of the survey area.

3. The photogrammetric ground control point quality evaluation method based on Monte Carlo test as claimed in claim 2, wherein in the sub-step S1.2, the automatic feature point matching is performed by a scale-invariant feature transform (SIFT) image matching algorithm.

4. The photogrammetric ground control point quality evaluation method based on Monte Carlo test as claimed in claim 2, wherein in the sub-step S1.4, the aerial triangulation densification is performed by a structure from motion (SfM) algorithm.

5. The photogrammetric ground control point quality evaluation method based on Monte Carlo test as claimed in claim 1, wherein in the step S2, 50% of the number of the ground control points are selected as the control points to participate in the bundle adjustment optimization.

6. The photogrammetric ground control point quality evaluation method based on Monte Carlo test as claimed in claim 1, wherein in the sub-step S5.1, a formula for calculating the average errors of each ground control point as the control point and the check point respectively is as follows:

$$M_{mean} = \frac{\sum_{i=1}^{w} x_i}{w},$$

where w represents a number of times that each ground control point as either the control point or the check point, and $x_i$ represents the error of each ground control point as either the control point or the check point in the step S3.

7. The photogrammetric ground control point quality evaluation method based on Monte Carlo test as claimed in claim 1, wherein in the sub-step S5.2, formulas for calculating the quality coefficient Q of each ground control point are as follows:

$$Q_{ch} = \frac{x_{ich} - \mu_{ch}}{\sigma_{ch}},$$

$$Q_{co} = \frac{x_{ico} - \mu_{co}}{\sigma_{co}},$$

$$Q = \frac{Q_{ch} - Q_{co}}{2},$$

where $Q_{ch}$ represents a quality coefficient of the ground control point as the check point, $Q_{co}$ represents a quality coefficient of the ground control point as the control point, $x_{ich}$ represents the average error of the ground control point as the check point, $x_{ico}$ represents the average error of the ground control point as the control point, $\mu_{ch}$ represents an average value of the average errors of the ground control points as the check points, $\mu_{co}$ represents an average value of the average errors of the ground control points as the control points, $\sigma_{co}$ represents the standard deviation of the ground control point as the control point and $\sigma_{ch}$ represents the standard deviation of the ground control point as the check point.

8. The photogrammetric ground control point quality evaluation method based on Monte Carlo test as claimed in claim 1, wherein in the sub-step S5.3, when the quality coefficient Q is less than 1, quality of the respective ground control point is evaluated as excellent, when the quality coefficient Q is less than 2 but not less than 1, the quality of the respective ground control point is evaluated as good, when the quality coefficient Q is less than 3 but not less than 2, the quality of the respective ground control point is evaluated as average, and when the quality coefficient Q is not less than 3, the quality of the respective ground control point is evaluated as poor.

* * * * *